(12) United States Patent
de Castro et al.

(10) Patent No.: US 11,576,469 B2
(45) Date of Patent: Feb. 14, 2023

(54) GRIP ENHANCER FOR FOOTWEAR

(71) Applicant: TERRAIGNOTA Ventures, LLC, Newton Center, MA (US)

(72) Inventors: Sophia I. de Castro, Newton, MA (US); José Tadeo V. de Castro, Newton, MA (US)

(73) Assignee: Terraignota Ventures, LLC, Newton Center, MA (US)

( * ) Notice: Subject to any disclaimer, the term of this patent is extended or adjusted under 35 U.S.C. 154(b) by 432 days.

(21) Appl. No.: 16/725,149

(22) Filed: Dec. 23, 2019

(65) Prior Publication Data

US 2020/0205525 A1 Jul. 2, 2020

Related U.S. Application Data

(60) Provisional application No. 62/784,950, filed on Dec. 26, 2018.

(51) Int. Cl.
| | |
|---|---|
| *B32B 3/10* | (2006.01) |
| *A43C 15/00* | (2006.01) |
| *B32B 7/022* | (2019.01) |
| *A43B 5/02* | (2006.01) |
| *B32B 7/12* | (2006.01) |
| *B32B 27/32* | (2006.01) |

(52) U.S. Cl.
CPC ............. *A43C 15/00* (2013.01); *A43B 5/025* (2013.01); *B32B 7/022* (2019.01); *B32B 7/12* (2013.01); *B32B 27/322* (2013.01); *B32B 2307/538* (2013.01); *B32B 2437/02* (2013.01)

(58) Field of Classification Search
None
See application file for complete search history.

(56) References Cited

U.S. PATENT DOCUMENTS

| | | | |
|---|---|---|---|
| 2007/0006490 A1* | 1/2007 | Kay ...................... | A43B 7/144 36/135 |
| 2009/0007457 A1* | 1/2009 | Skirrow ........... | A41D 19/01558 36/114 |

FOREIGN PATENT DOCUMENTS

| | | |
|---|---|---|
| EP | 2319341 A1 | 5/2011 |
| FR | 2293884 A1 | 7/1976 |
| KP | 2003 0033797 A | 5/2003 |
| WO | 2015/117179 A1 | 8/2015 |

* cited by examiner

*Primary Examiner* — Christopher M Polley
(74) *Attorney, Agent, or Firm* — Occhiuti & Rohlicek LLP

(57) ABSTRACT

A cap for capping an upper surface of a shoe a first layer, a second layer, and a third layer. The first layer has an outer surface that has a coefficient of friction that is greater than that of the upper surface of the shoe that that the cap caps. The second layer is an adhesive layer. Third layer is a release layer that can be peeled off the adhesive layer to expose it, thereby enabling said adhesive layer to stick to said shoe.

18 Claims, 2 Drawing Sheets

GRIP ENHANCER FOR FOOTWEAR

CROSS REFERENCE TO RELATED APPLICATIONS

This application claims the benefit of the Dec. 26, 2018 priority date of U.S. Provisional Application 62/784,950.

FIELD OF DISCLOSURE

This disclosure relates to footwear, and in particular, to accessories to enhance the function of footwear.

BACKGROUND

It is known to enhance the ability of footwear to grip a surface. Doing so promotes safety and also enhances one's ability to change direction rapidly.

For example, many athletic shoes have surfaces that grip the floor. Examples include rubber surfaces on sneakers for gripping hard surfaces and cleats, such as those on soccer shoes, for gripping turf.

In some cases, the ability to grip relies on a removable accessory. For example, in mountaineering, it is customary to wear removable crampons that assist in gripping ice.

Known gripping structures on footwear have in common the idea that there exists a two-dimensional generally planar surface upon which the shoe is intended to maintain a good grip and that the sole of the shoe should be modified in order to promote the ability to grip on this surface.

SUMMARY

The invention is based on the recognition that there exist surfaces other than two-dimensional planar surfaces that are to be gripped and that the sole is not the only portion of the shoe that can grip.

In one aspect, the invention features a cap for covering an upper surface of a shoe. The cap comprises a first layer, a second layer, and a third layer. The first layer has an outer surface that has a coefficient of friction that is greater than the upper surface of a shoe to be capped by the cap. The second layer is an adhesive layer. The third layer is a release layer that can be peeled off the adhesive layer to expose the adhesive layer, thereby enabling the adhesive layer to stick to the shoe.

In some embodiments, the cap comprises a midline and lobes. In these embodiments, the midline covers laces of the shoe and the lobes fold over to engage sides of the shoe.

In other embodiments, the outer surface of the first layer comprises a fiducial marking to promote alignment of the cap with a feature on the shoe.

In yet other embodiments, there exists a midline, lobes extending laterally from side midline, and hinges between the lobes and the midlines.

Also among the amendments are those that include a second set of layers that are disposed on the first layer. This second set of layers comprising a gripping layer and an adhesive layer, with the adhesive layer being between the first layer and the gripping layer.

Also among the embodiments are those in which the first layer includes neoprene, those in which the first layer includes a thermoplastic urethane, those in which the first layer includes a thermoplastic elastomer, and those in which the first layer includes silicone.

These and other features of the invention will be apparent from the following detailed description and the accompanying figures, in which:

DETAILED DESCRIPTION

Figure 1:
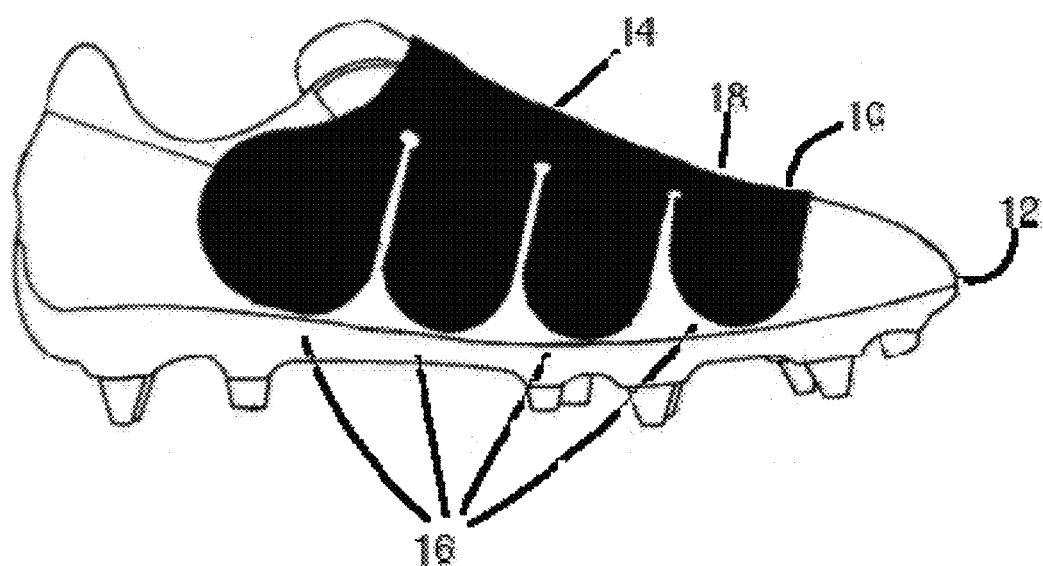
FIG. 1 shows a cap on a shoe.

FIG. 1 shows a cap 10 attached to a shoe 12. The cap 10 has a midline 14 that covers the shoe's laces. Extending laterally from the midline 14 on either side are lobes 16. The lobes 16 extend far enough so that, when folded over as shown in FIG. 1, the lobes 16 cover the shoe's vamp 18 and its side 20. As is apparent from FIG. 3, the cap 10 has essentially bilateral symmetry, with minor variations to accommodate the shape of the shoe 12.

Figure 2:
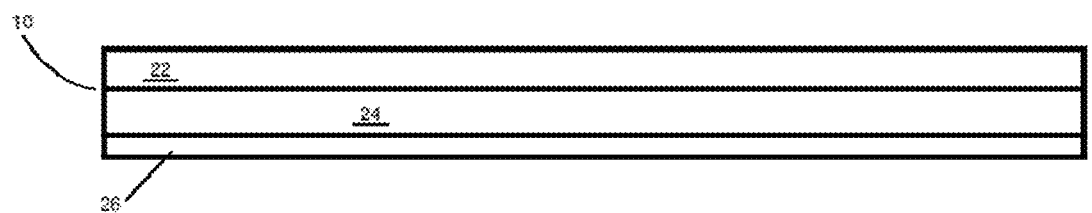
FIG. 2 shows a cross-section of the cap shown in FIG. 1.

The cap 10 is a multilayer structure having flexible first, second, and third layers 22, 24, 26, as shown in FIG. 2.

The first layer 22 is a gripping layer having an outer surface and an inner surface. The outer surface of the first layer 22 is made of a material having a first friction coefficient. The shoe itself has a second friction coefficient. The first friction coefficient exceeds the second friction coefficient. The inner surface of the first layer 22 faces the second layer 24. Suitable materials for use as a first layer 22 include neoprene, silicone, and mixtures thereof, including high-gloss silicone. Other suitable materials include thermoplastic urethane and thermoplastic elastomer.

In some embodiments, the first layer 22 has a thickness of about 0.038 inches. In other embodiments, the first layer 22 has a thickness in the range between $N*10^{-2}$ inches and $(N+1)*10^{-2}$ inches where N is an integer between 1 and 5 inclusive.

In some embodiments, the coefficient of friction of the first layer 22 is 2.0 when dry and 1.4 when wet. In other embodiments, the coefficient of friction of the first layer 22 is 1.3 when dry and 1.1 when wet. Yet other embodiments include those in which the coefficient of friction, whether wet or dry, is between N and N+1 where N is an integer between 1 and 3 inclusive.

Yet other embodiments include those in which the hardness of the first layer 22, as measured by a Shore A durometer, is between 13 and 73. In still other embodiments, the hardness of the first layer 22 as measured by a Shore A durometer is in one of the ranges defined by a value between $N*10$ and $(N+1)*10$ where N is an integer between 1 and 7 inclusive.

The second layer 24 is an adhesive layer having an outer surface and an inner surface. The outer surface of the second layer 24 adheres to the inner surface of the first layer 22. The inner surface of the second layer 24 adheres to the third layer 26. This third layer 26 is a release layer that is peeled off to expose the adhesive on the second layer 24 so that the cap 10 can be attached to the shoe 12.

Figure 3:
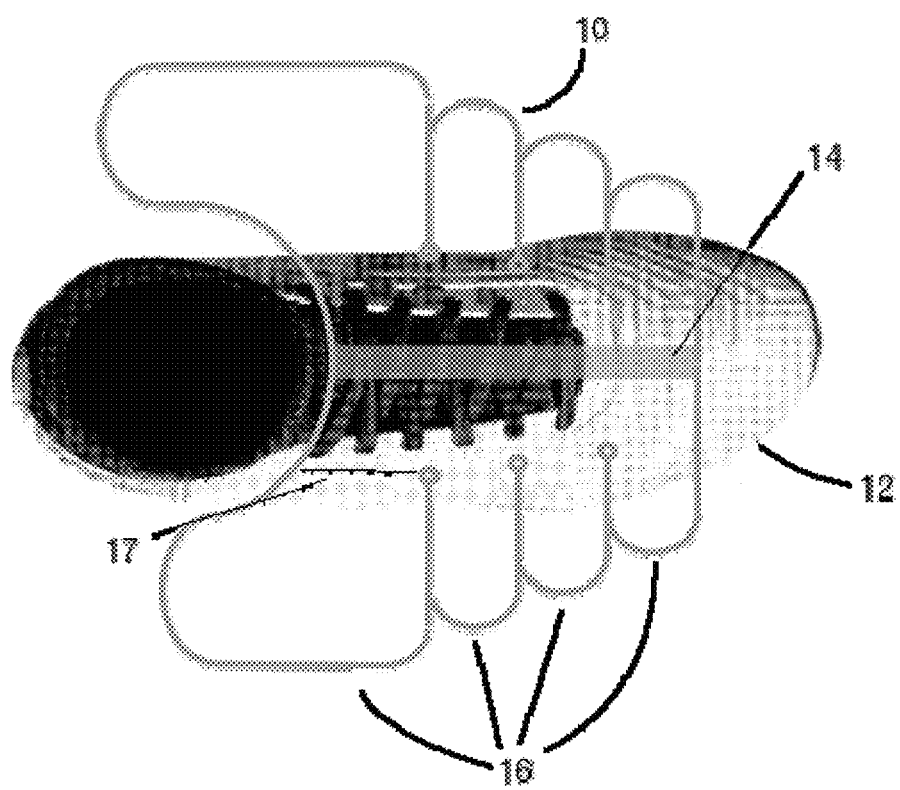
FIG. 3 shows a cap of FIG. 1 prior to being placed on the shoe.

Prior to being placed on the shoe 10, the player lays out the cap 10 so that it is flat as shown in FIG. 3. The release layer 26 is then peeled off, thus exposing the adhesive second layer 24. The player then places the cap 10 over the shoe as shown in FIG. 3 and folds the lobes 16 into position as shown in FIG. 1. In some embodiments, a fiducial marking imprinted on the first layer 22 promotes the player's ability to align the cap 10 with the laces. In some embodiments, hinges 17 promote the ability to fold the lobes 16 into position. In other embodiments, the cap 10 covers the laces.

Once the cap 10 has been correctly positioned, the player proceeds to enjoy the higher coefficient of friction associated with the first layer 22. The grip provided by this additional friction promotes easier ball handling and promotes exploitation of the Magnus effect.

As time goes on, the player will soon discover a decline in ball-handling ability as a result of wear on the first layer 22. When this happens, the player has the option of replacing the cap 10 with a fresh cap.

Figure 4:
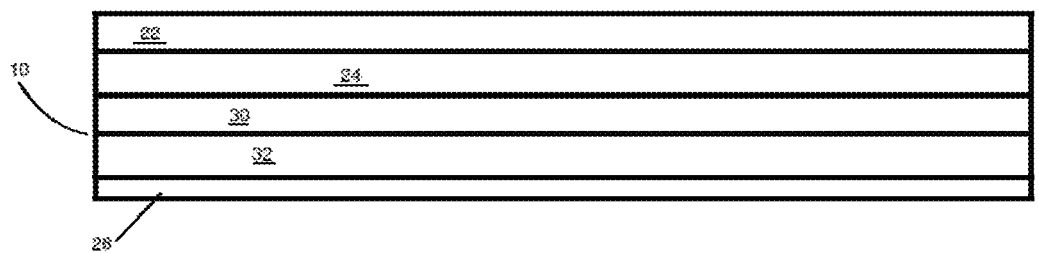
FIG. 4 shows a cross-section of an alternative embodiment of the cap shown in FIG. 1.

An alternative embodiment, shown in FIG. 4, permits the user to peel off the used layer to reveal a fresh new layer of the same type. The illustrated embodiments includes layers in series.

A first first-layer 22 is in series with a second set of layers. In particular, the cap 10 shown in FIG. 4 has a first second-layer 24 in series with a second first-layer 30 and a second second-layer 32.

In this embodiment, the player relies on the first first-layer 22 until it has become worn. At this point, the player simply peels off the first first-layer 22 and the first second-layer 24 so as to expose the second first layer 30. This series connection of layers can continue, with the constraint being that as the number of layers increases, the cap 10 becomes unwieldy.

In some embodiments, the friction layer 22 includes various surface features or textures. These include raised features, such as bosses, ridges, and bumps. These also include concave or depressed features, such as grooves, sipes or dimples. In some embodiments, the first layer includes perforations, apertures, or through-holes. In yet other embodiments, the first layer 22 includes dimples having a depth equal to the thickness of the first layer.

The invention claimed is:

1. A manufacture comprising a cap for covering an upper surface of a shoe, wherein said upper surface has a first coefficient of friction, wherein said cap comprises a first set of layers, wherein said first set of layers comprises a first layer, a second layer, and a third layer, wherein said first layer has an outer surface that has a second coefficient of friction, wherein said second coefficient of friction exceeds said first coefficient of friction, wherein said second layer is an adhesive layer, and wherein said third layer is a release layer that can be peeled off said adhesive layer to expose said adhesive layer, thereby enabling said adhesive layer to stick to said shoe, and wherein said manufacture further comprises a midline, lobes extending laterally from side midline, and hinges between said lobes and said midlines.

2. The manufacture of claim 1, wherein said midline covers laces of said shoe, and wherein said lobes fold over to engage sides of said shoe.

3. The manufacture of claim 1, wherein said outer surface of said first layer comprises a fiducial marking to promote alignment of said cap with a feature on said shoe.

4. The manufacture of claim 1, further comprising a second set of layers, said second set of layers comprising a gripping layer and an adhesive layer, said adhesive layer being between said first layer and said gripping layer.

5. The manufacture of claim 1, wherein said first layer comprises neoprene.

6. The manufacture of claim 1, wherein said first layer comprises silicone.

7. The manufacture of claim 1, wherein said first layer comprises thermoplastic urethane.

8. The manufacture of claim 1, wherein said first layer comprises thermoplastic elastomer.

9. The manufacture of claim 1, wherein said cap is configured to cover laces of said shoe.

10. A method comprising manufacturing a manufacture comprising a cap for covering an upper surface of a shoe, wherein said upper surface has a first coefficient of friction, wherein said cap comprises a first set of layers, wherein said first set of layers comprises a first layer, a second layer, and a third layer, wherein said first layer has an outer surface that has a second coefficient of friction, wherein said second coefficient of friction exceeds said first coefficient of friction, wherein said second layer is an adhesive layer, wherein said third layer is a release layer that can be peeled off said adhesive layer to expose said adhesive layer, thereby enabling said adhesive layer to stick to said shoe, and wherein said manufacture further comprises a midline, lobes extending laterally from said midline, and hinges between said lobes and said midline.

11. A manufacture comprising a cap for covering an upper surface of a shoe, wherein said upper surface has a first coefficient of friction, wherein said cap comprises a first set of layers, wherein said first set of layers comprises a first layer, a second layer, and a third layer, wherein said first layer has an outer surface that has a second coefficient of friction, wherein said second coefficient of friction exceeds said first coefficient of friction, wherein said second layer is an adhesive layer, and wherein said third layer is a release layer that can be peeled off said adhesive layer to expose said adhesive layer, thereby enabling said adhesive layer to stick to said shoe, said manufacture further comprising a second set of layers, said second set of layers comprising a gripping layer and an adhesive layer, said adhesive layer being between said first layer and said gripping layer.

12. The manufacture of claim 11, further comprising a second set of layers, said second set of layers comprising a gripping layer and an adhesive layer, said adhesive layer being between said layer and said gripping layer.

13. The manufacture of claim 11, wherein said cap is configured to cover laces of said shoe.

14. The manufacture of claim 11, wherein said outer surface of said first layer comprises a fiducial marking to promote alighnment of said cap with a feature on said shoe.

15. The manufacture of claim 11, wherein said midline covers laces of said shoe, and wherein said lobes fold over to engage sides of said shoe.

16. The manufacture of claim 11, wherein said first layer comprises thermoplastic elastomer.

17. The manufacture of claim 11, wherein said first layer comprises silicone.

18. The manufacture of claim 11, wherein said first layer comprises neoprene.

* * * * *